Nov. 9, 1954 H. S. PIKE 2,693,644
CABLE MEASURING MACHINE
Filed Jan. 12, 1952 3 Sheets-Sheet 1

INVENTOR
H. S. PIKE
BY
*[signature]*
ATTORNEY

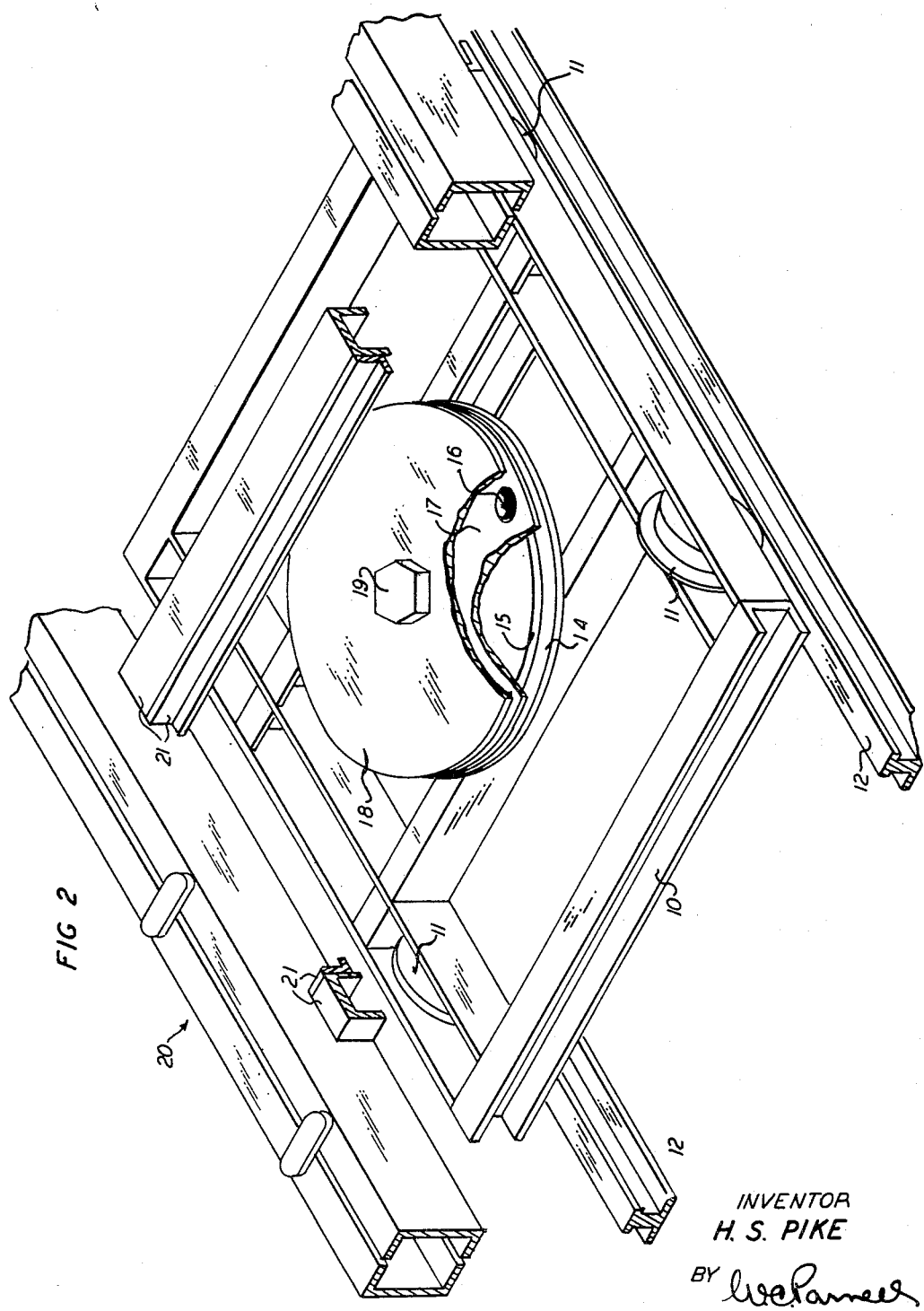

Nov. 9, 1954
H. S. PIKE
2,693,644
CABLE MEASURING MACHINE
Filed Jan. 12, 1952
3 Sheets-Sheet 3
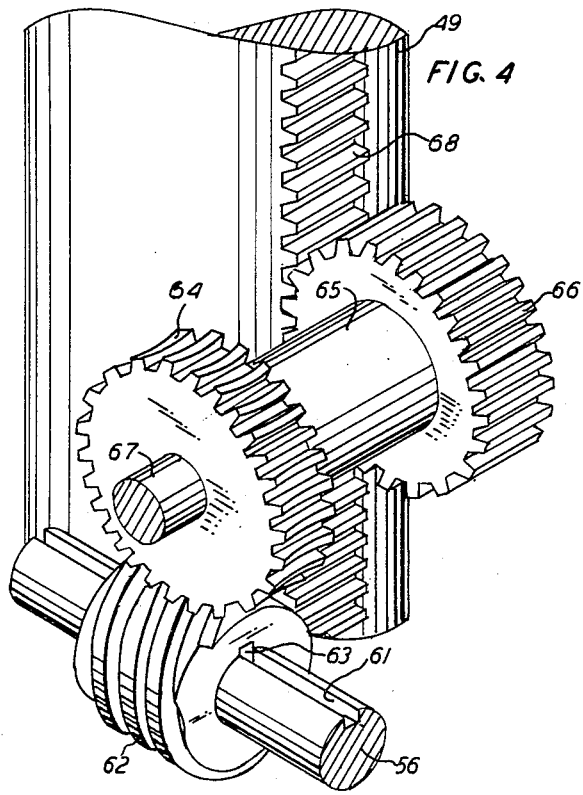
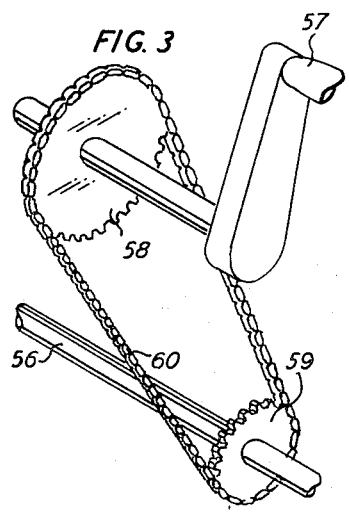
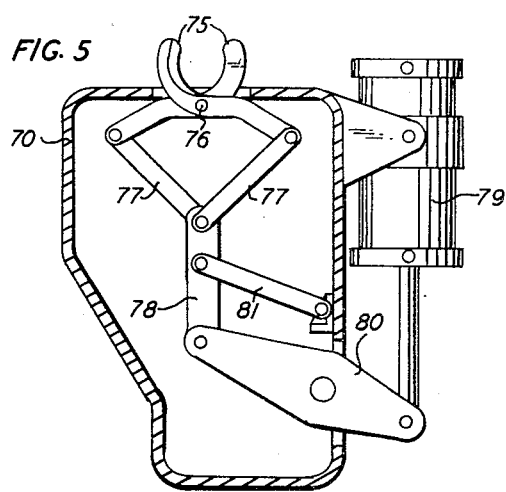
INVENTOR
H. S. PIKE
BY
*W. C. Parnell*
ATTORNEY

United States Patent Office 2,693,644
Patented Nov. 9, 1954

2,693,644

CABLE MEASURING MACHINE

Harold S. Pike, Fanwood, N. J., assignor to Western Electric Company, Incorporated, New York, N. Y., a corporation of New York Application January 12, 1952, Serial No. 266,215

4 Claims. (Cl. 33—129)

This invention relates to cable reeling apparatus and paritcularly to apparatus for removing measured lengths of cables of various sizes from supply reels and winding them on takeup reels.

In many localities, supplies of the various sizes of cables required for the telephone industry are stored in distributing houses on supply reels of various sizes. When orders are received for particular lengths of cables, it is necessary to support the supply reels for rotation while the cables are removed therefrom. The required lengths of cable then must be measured, cut off and wound on takeup reels. The reels for supporting cables of this type are heavy and various types of apparatus have been employed to support them individually. In large distributing houses considerable time and labor are required to move and set up the reel supports and the measuring and takeup units at each new position.

The object of this invention is an improved reeling apparatus of this general type.

With this and other objects in view, the invention comprises a unitary reeling apparatus readily movable as a unit and adapted to receive supply and takeup reels of various sizes. Means is provided for removing and severing accurately measured lengths of cable from the supply reels and for uniformly distributing the severed lengths on the takeup reels.

In one embodiment of the invention, a movable carriage supports a turret for a frame having cradles mounted at opposite ends thereof to readily receive and rotatably support supply and takeup reels of various sizes. A distributing mechanism, carried by the frame and readily adjustable with respect to the paths of the cables travelling between the reels, supports a counter unit to measure the lengths of cables, guides for the cables and a cutter actuable to cut the measured lengths from the supplies.

The cradles for the reels is the subject matter of my co-pending application, Serial Number 266,214 filed January 12, 1952. The guides for the cable in the distributing mechanism is the subject matter of my co-pending application, Serial Number 266,212 filed January 12, 1952, now Patent No. 2,657,879, issued November 3, 1953, and the counter unit movable with the distributing unit is the subject matter of my co-pending application, Serial Number 266,213 filed January 12, 1952.

Other objects and advantages will be apparent from the following detailed description when considered in conjunction with the accompanying drawings wherein:

Fig. 2 is a fragmentary isometric view of the carriage and the turret support for the main frame.

Fig. 3 is a fragmentary isometric view of a portion of the elevating means for the distributor unit.

Fig. 4 is a fragmentary isometric view of another portion of the elevating means for the distributor unit and Fig. 5 is a detailed view of the cutting unit.

Figure 1:
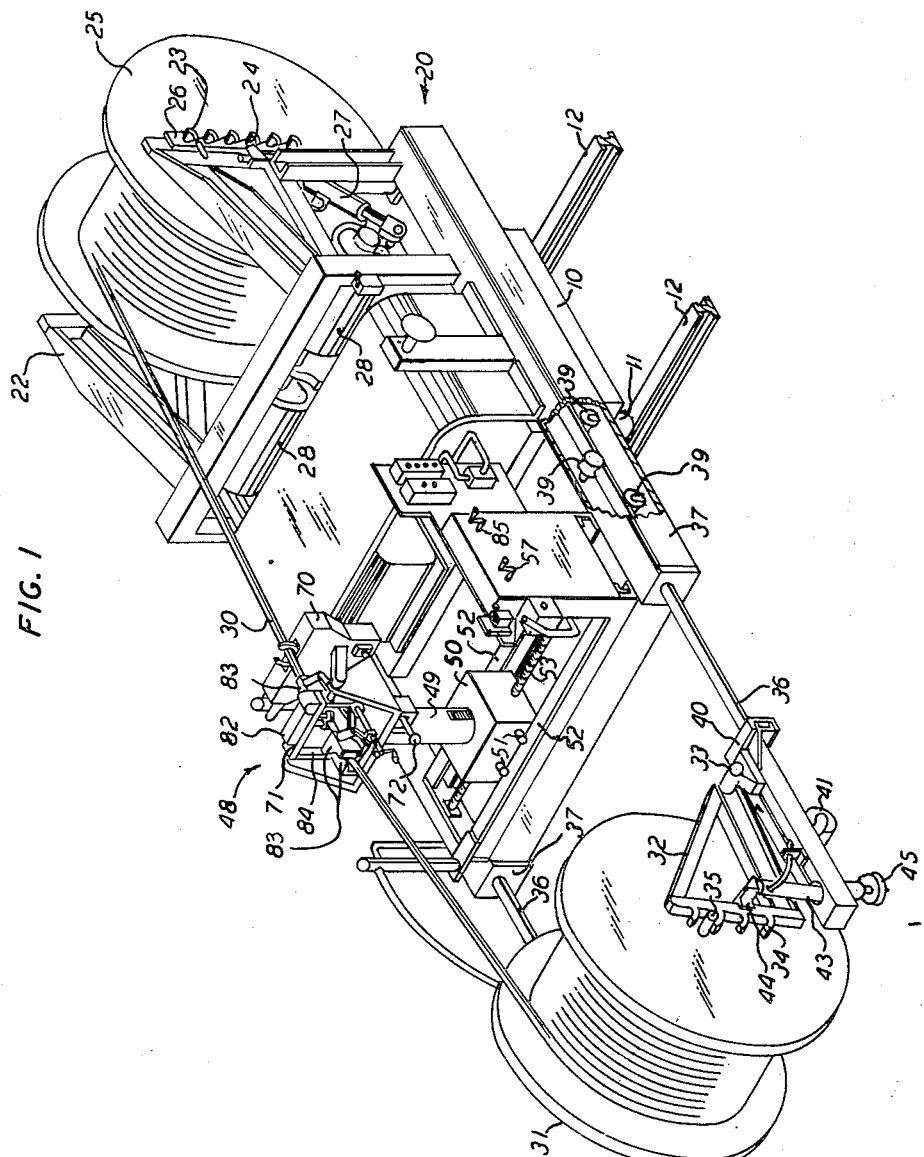
Fig. 1 is an isometric view of the reeling apparatus.

Referring now to the drawings, attention is first directed to Figs. 1 and 2 which illustrate a carriage 10 having supporting wheels 11 mounted on parallel tracks 12 supported in or on the floor. The carriage 10 has a member 14 circular in general contour mounted thereon and provided with an annular ball race to receive a series of ball members 16 held against displacement by an intermediate member 17 apertured to receive the ball members. An upper member 18 similar in contour to the member 14, is mounted for rotation on a central shaft 19 which is in the form of a bolt securing the upper member for rotation about the center line of the ball race 15. A frame indicated generally at 20 has laterally extending members 21 secured to the top member 18 whereby the frame and everything supported thereby may travel with the carriage on the tracks to any desired location and move about the axis of the shaft 19 into desirable positions to reecive the reels.

A cradle 22 has side members provided with series of members 23 disposed at various levels to receive the ends of a shaft 24 of takeup reels 25 of various sizes. The cradle 22 may be moved about its supporting pivot through fluid operated means not shown at which time latches 26 supported by the sides of the cradle will engage the ends of the reel supporting shaft to hold it against displacement. Furthermore, units 27 interconnecting the frame 20 and the cradle 22 move driven rollers 28 into engagement with the heads of the reels 25 regardless of their sizes to drive the reels singly to wind cables 30 thereon received from supply reels 31. The supply reels 31 will vary in size depending upon the size of the cable stored thereon. Therefore at the supply end of the apparatus a substantially U shaped cradle 32 pivoted at 33 is provided with sets of members 34 on their side portions to receive the ends of a shaft 35 extending through a selected one of the supply reels 31.

The cradle 32 is supported by parallel rods 36 which extend into hollow parallel side members 37 of the frame 20 where they are supported for movement relative to the frame by rollers 39. The rods 36 are connected at 40 so that they may move in unison to support the supply reel a desired distance from the takeup reel 25. Rollers 41 are positioned to assist in supporting the rods 36 and the supply unit mounted on the rods. Furthermore, fluid operated units 43 composed of pistons and cylinders are interposed between brackets 44 fixed to the sides of the cradle 32 and supporting feet 45 functioning as was disclosed in my co-pending application to further assist in supporting the supply mechanism to lock the frame against movement and to elevate the cradle 32 with the supply reel to a desired position free of the floor.

A distributor indicated generally at 48 is interposed between the supply and the takeup units. The distributor in the present embodiment of the invention is supported by a vertical shaft 49 journaled in suitable bearings in a housing 50 which has sets of rollers 51 mounted on tracks 52 to support and guide the unit between predetermined limits resulting from the rotation of a feed screw 53. The feed screw 53 is driven first in one direction and then in the other at variable speeds and between predetermined variable limits by suitable driving means not shown and under the control of limit and reversing switches causing repeated driving of the power means for the screw until de-energized upon the completion of cable of a measured length removed from the supply reel.

Another shaft 56 parallel with the threaded shaft 53 and suitably journaled in bearings supported by the frame 20 may be rotated in either direction through the actuation of a crank 57 and the sprockets 58 and 59 connected by a chain 60. The shaft 56 has a longitudinally extending keyway 61 so that a worm 62 keyed thereto at 63 may move longitudinally of the shaft. The worm 62 interengages a worm gear 64 which is fixed to a hollow shaft 65 with a pinion 66 and mounted for rotation on a shaft 67. The pinion 66 interengages a rack 68 which is made a part of the supporting shaft 49. Through this mechanism shown in Figs. 3 and 4, the distributor 48 may be raised or lowered to lie in the general path of the cable which may vary as the cable pays off the supply and builds up on the takeup reel.

A cutting unit 70 is pivotally supported on a shaft 71 and is normally positioned out of the path of the cable 30 but may be moved into cutting position shown in Fig. 1 by a push rod 72. The cutting unit 70 is shown in detail in Fig. 5 and includes cutting jaws 75 pivotally supported at 76 and having their inner arms connected through links 77 to an element 78 whereby operation of a fluid operable unit 79, the connecting lever 80 and link 81 will bring about simultaneous actuation of the cutting jaws 75 to cut the cable 30 at the end of each measured length.

A counter unit 82 and guide roller units 83 positioned on each side of the counter unit are all supported by a cradle 84 mounted on the shaft 71 so as to float and be easily moved about the axis of the shaft 71, yet control the distribution of the cable on the takeup reel 25. The operator in observing the distribution of the cable determines the need for varying the position of the distributor unit and may readily actuate the mechanism shown in Figs. 3 and 4 to bring about these variations while observing the counter unit in determining the measurement of the cable.

It will be apparent that the reeling apparatus is a complete structure readily movable from one position to another to bring it into the general area of the supply reel from which a measured length of cable is to be removed. The main structure of the apparatus including the frame and all the units supported thereby, may be moved about the turret axis to readily receive the supply reel of cable and elevate it free of the floor for threading of the cable through the guide roller units 83 and between the rollers of the measuring unit. A takeup reel of any desired size depending upon the size of the cable may be received by the cradle 22 and elevated to a reeling position free of the floor. During elevation of the cradle 22 the latches 26 are operated into closed positions and the driving rollers 28 are positioned to drive the takeup reel.

Suitable control means for varying the traversing limits of the distributor 48 are under the control of a crank 85 to assure uniform distribution of cables on reels of various sizes wherein the heads are positioned varied distances apart thus requiring adjustment in the limits of the reciprocal distributor unit 48.

When one measured length of a cable of a given size is wound on the takeup reel 25, the cutting unit may be moved into position through the aid of the push rod 72 and a valve actuated to operate the unit 79 to actuate the cutter to cut the measured length from the supply. The remaining portion of the measured length will wind upon the takeup reel and at that time the takeup reel may be lowered, disconnecting it from its driving means freeing the latches 26 from the shaft 24, permitting the reel with the measured length of cable thereon to roll free of the apparatus. The supply reel may be lowered to rest upon the floor and be returned to its original position. The apparatus is now free to be moved to another position, to receive another supply reel of cable and to measure a given length thereof as it is distributed on another takeup reel 25. In travelling from one location to another, the mechanism for supporting the supply reel is moved close to the main frame 20 and the main portion of the frame and the structure supported thereby is moved in general alignment with the tracks 12, so that the apparatus may travel with the carriage on the tracks without striking reels which may be positioned near the tracks.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A cable reeling apparatus comprising a carriage supported for movement, a frame, a unit disposed at one end of the frame and having pairs of recesses at different heights to receive shafts of supply reels of various sizes singly, a unit disposed at the other end of the frame and having pairs of recesses at different heights to receive shafts of takeup reels of various sizes singly, a turret mounted on the carriage to support the frame for movement about the axis of the turret to position the units to receive predetermined supply and takeup reels, and a distributor interposed between the units to distribute a cable from the supply reel onto the takeup reel.

2. A cable reeling apparatus comprising a carriage supported for movement, a frame, a unit disposed at one end of the frame and having pairs of recesses at different heights to receive shafts of supply reels of various sizes singly, a unit disposed at the other end of the frame and having pairs of recesses at different heights to receive shafts of takeup reels of various sizes singly, a turret mounted on the carriage to support the frame for movement about the axis of the turret to position the units to receive predetermined supply and takeup reels, a distributor for the cable interposed between the units, means to reciprocate the distributor between given horizontal limits to distribute the cable on the takeup reel, and means actuable to raise and lower the distributor with variations in the general path of travel of the cable between selected reels of different sizes.

3. A cable reeling apparatus comprising a carriage supported for movement, a frame, a unit disposed at one end of the frame and having pairs of recesses at different heights to receive shafts of supply reels of various sizes singly, a unit disposed at the other end of the frame and having pairs of recesses at different heights to receive shafts of takeup reels of various sizes singly, a turret mounted on the carriage to support the frame for movement about the axis of the turret to position the units to receive predetermined supply and takeup reels, a distributor for the cable interposed between the units, means to reciprocate the distributor between given horizontal limits to distribute the cable on the takeup reel, means actuable to raise and lower the distributor with variations in the general path of travel of the cable between selected reels of different sizes, a cable guide for the distributor, and a cradle supporting the guide mounted for rocking movement in the distributor about an axis transverse the path of the cable whereby the position of the guide may vary with variations in the path of the cable.

4. A cable reeling apparatus comprising a carriage supported for movement, a frame, a unit disposed at one end of the frame and having pairs of recesses at different heights to receive shafts of supply reels of various sizes singly, a unit disposed at the other end of the frame and having pairs of recesses at different heights to receive shafts of takeup reels of various sizes singly, a turret mounted on the carriage to support the frame for movement about the axis of the turret to position the units to receive predetermined supply and takeup reels, a distributor for the cable interposed between given horizontal limits to distribute the cable on the takeup reel, means actuable to raise and lower the distributor with variations in the general path of travel of the cable between selected reels of different sizes, a counter unit actuable by a roller thereof driven by the cable to measure the cable, guides for the cable disposed in front and in back of the counter unit, and a cradle for supporting the counter unit and the guides mounted on the distributor for rocking movement about an axis transverse the path of the cable whereby the positions of the counter units and guides may vary with variations in the path of the cable.

References Cited in the file of this patent

UNITED STATES PATENTS

| Number | Name | Date |
| --- | --- | --- |
| 543,823 | Allis | July 30, 1895 |
| 1,228,059 | Schneider | May 29, 1917 |
| 1,652,407 | Johnson | Dec. 13, 1927 |
| 1,763,871 | Taylor | June 17, 1930 |
| 1,836,815 | Reeves | Dec. 15, 1931 |
| 1,941,250 | Dale | Dec. 26, 1933 |
| 2,223,110 | Kempe | Nov. 26, 1940 |
| 2,340,436 | Stone | Feb. 1, 1944 |
| 2,401,518 | Smith | June 4, 1946 |
| 2,494,732 | Weber | Jan. 17, 1950 |
| 2,546,794 | Sole | Mar. 27, 1951 |

FOREIGN PATENTS

| Number | Country | Date |
| --- | --- | --- |
| 943,746 | France | Oct. 11, 1948 |